United States Patent
Murakami et al.

(10) Patent No.: US 9,428,882 B2
(45) Date of Patent: Aug. 30, 2016

(54) CONSTRUCTION MACHINE

(71) Applicant: KOBELCO CONSTRUCTION MACHINERY CO., LTD., Hiroshima-shi (JP)

(72) Inventors: Masaaki Murakami, Hiroshima (JP); Hironori Tsukamoto, Hiroshima (JP); Tsuyoshi Noda, Hiroshima (JP)

(73) Assignee: KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 0 days.

(21) Appl. No.: 14/560,008

(22) Filed: Dec. 4, 2014

(65) Prior Publication Data
US 2015/0176245 A1    Jun. 25, 2015

(30) Foreign Application Priority Data
Dec. 20, 2013   (JP) .................. 2013-264092

(51) Int. Cl.
*B60R 3/00*    (2006.01)
*E02F 9/08*    (2006.01)

(52) U.S. Cl.
CPC ............ *E02F 9/0858* (2013.01); *B60R 3/005* (2013.01); *E02F 9/0808* (2013.01); *E02F 9/0833* (2013.01); *E02F 9/0866* (2013.01); *E02F 9/0883* (2013.01)

(58) Field of Classification Search
CPC ... E02F 9/0833; E02F 9/0858; E02F 9/0866; E02F 9/0808; E02F 9/0883; B60R 3/005
See application file for complete search history.

(56) References Cited

U.S. PATENT DOCUMENTS

| 6,170,180 | B1 * | 1/2001 | Schaeff | E02F 3/325 220/4.14 |
| 7,523,804 | B2 * | 4/2009 | Tanaka | B60K 15/073 180/291 |

(Continued)

FOREIGN PATENT DOCUMENTS

| JP | 2003-3522 | 1/2003 |
| JP | 2004-143887 A | 5/2004 |

(Continued)

OTHER PUBLICATIONS

Partial European Search Report issued May 12, 2015 in Patent Application No. 14196785.1.

(Continued)

*Primary Examiner* — Paul N Dickson
*Assistant Examiner* — Timothy Wilhelm
(74) *Attorney, Agent, or Firm* — Oblon, McClelland, Maier & Neustadt, L.L.P.

(57) ABSTRACT

Provided is a construction machine having a central foothold and a maintenance access passage with high safety. The construction machine includes an upper slewing body including: an upper frame, an engine compartment, a cabin on a right or left region of the upper frame, a central foothold immediately forward of the engine compartment and on a central region of the upper frame widthwise of the upper frame, and a maintenance access passage extending rearward while elevated to guide a worker from the ground forward of the upper frame to the central foothold on a side opposite to the cabin. Widthwise of the upper frame, an inward edge of an upper end portion of the maintenance access passage is located inward of one edge of the central foothold, to thereby form a transit zone between the maintenance access passage and the central foothold.

6 Claims, 4 Drawing Sheets

(56) References Cited

U.S. PATENT DOCUMENTS

| | | | |
|---|---|---|---|
| 8,006,991 B2* | 8/2011 | Taniuchi | E02F 9/0833 180/68.1 |
| 8,661,793 B2* | 3/2014 | Yamashita | B60K 13/04 60/286 |
| 8,820,457 B2* | 9/2014 | Nishimura | E02F 9/0858 180/89.13 |
| 8,955,631 B2* | 2/2015 | Nishimura | E02F 9/0858 180/68.1 |
| 9,027,697 B2* | 5/2015 | Kobayashi | E02F 9/0875 180/296 |
| 2005/0166429 A1 | 8/2005 | Tanaka et al. | |
| 2010/0206927 A1* | 8/2010 | Noda | E02F 9/00 224/401 |
| 2012/0174566 A1 | 7/2012 | Yamashita et al. | |
| 2013/0037551 A1* | 2/2013 | Nishiyama | B60K 15/063 220/564 |
| 2014/0186151 A1* | 7/2014 | Ootsuka | E02F 9/0833 414/685 |

FOREIGN PATENT DOCUMENTS

| | | |
|---|---|---|
| JP | 2010-7419 | 1/2010 |
| JP | 2010-47975 | 3/2010 |
| JP | 2010-150835 | 7/2010 |
| JP | 2011-74595 | 4/2011 |
| JP | 5106711 | 12/2012 |
| WO | WO 03/080945 A1 | 10/2003 |
| WO | WO 2011/033732 A1 | 3/2011 |
| WO | WO 2013/179780 A1 | 12/2013 |

OTHER PUBLICATIONS

Extended European Search Report issued Jul. 28, 2015 in Patent Application No. 14196785.1.

Office Action issued Oct. 27, 2015 in Japanese Patent Application No. 2013-264092 (with unedited computer-generated English translation).

* cited by examiner

CONSTRUCTION MACHINE

TECHNICAL FIELD

The present invention relates to a construction machine having a foothold and an access passage for maintenance work on an engine and others.

BACKGROUND ART

Heretofore, there has been known a construction machine including a lower traveling body and an upper slewing body mounted on the lower traveling body, the upper slewing body having, in addition to an engine compartment housing a specific device which includes an engine, a central foothold serving as a foothold for performing maintenance on the device in the engine compartment, and a maintenance access passage serving as an access passage to the central foothold. This type of the construction machine having the central foothold and the maintenance access passage is disclosed, for example, in JP 2010-47975A (Patent Literature 1), JP 2010-150835A (Patent Literature 2) and JP 5106711B (Patent Literature 3).

However, each of construction machines described in the above Literatures includes discontinuity between a maintenance access passage and a central foothold in a front-rear direction, thereby involving a problem of forcing a worker to move in an irregular manner including oblique or transverse movement in a boundary region between the maintenance access passage and the central foothold. Specifically, following walking up the maintenance access passage, e.g., linearly, the worker has to turn rightward or obliquely rightward in order to transfer to the central foothold. Particularly, in the case of a stair-like maintenance access passage, the worker is more likely to be unbalanced, upon transit from the stair-like maintenance access passage to the central foothold, because of different walk from that during stair-climbing; hence, making the discontinuous transverse or oblique movement during such transit is likely to cause the worker's posture to be more unstable.

The Patent Literatures 2 and 3 disclose extending the maintenance access passage so as to locate a rear edge of an upper end portion of the maintenance access passage at a rear side of a front edge of the central foothold to thereby form a region in which the maintenance access passage and the central foothold are continuous with each other in a right-left direction; the region for transit between the maintenance access passage and the central foothold, however, still requires a transverse movement including an oblique movement.

Moreover, significant extension of the maintenance access passage, which is originally required to be formed within a limited space, is likely to involve difficulty in disposing other equipment.

SUMMARY OF INVENTION

It is an object of the present invention to provide a construction machine including a central foothold and a maintenance access passage and further allowing a worker to transfer between the central foothold and the maintenance access passage smooth and safely with low influence on arrangement of other equipment.

Provided is a construction machine which includes a lower traveling body and an upper slewing body slewably mounted on the lower traveling body, wherein the upper slewing body includes: an upper frame as a base; an engine compartment provided on a rear end region of the upper frame to house an engine and an engine-related device; a cabin provided on a front region of the upper frame in one of right and left regions of the upper frame; a central foothold for maintenance work, the central foothold provided immediately at a front side of the engine compartment and on a central region of the upper frame widthwise of the upper frame; and a maintenance access passage provided on a region which is one of the right and left regions of the upper frame and is on a side opposite to the cabin, the maintenance access passage extending rearward and upward to guide a worker from the ground at a front side of the upper frame to the central foothold. The maintenance access passage has an upper end portion including a most inward edge widthwise of the upper frame, the most inward edge being located inward, widthwise of the upper frame, of an edge which edge is one of opposite edges of the central foothold widthwise of the upper frame and which edge is closer to the maintenance access passage than the other edge, thereby aligning a part of the maintenance access passage and a part of the central foothold in a straight line extending in a front-rear direction to form a transit region between the maintenance access passage and the central foothold.

DESCRIPTION OF EMBODIMENTS

Figures 7, 8:
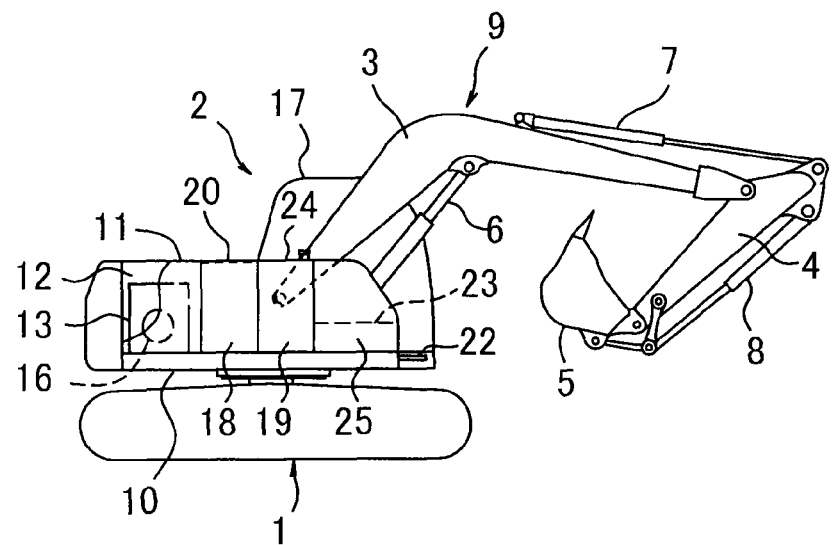
FIG. 7 is an overall schematic side view of a hydraulic excavator pertaining to the embodiments of the present invention and a comparative example.
FIG. 8 is a top plan view of the excavator of the comparative example.

In advance of explanation of embodiments of the present invention, described is a comparative example hypothetically prepared for the explanation and shown in FIGS. 7 and 8.

FIGS. 7 and 8 show a hydraulic excavator, which includes a crawler-type lower traveling body 1, an upper slewing body 2 mounted on the lower traveling body 1 slewably about an axis vertical to a ground surface, and a work attachment 9 attached to an front end of the upper slewing body 2. The work attachment 9 includes a boom 3, an arm 4, a bucket 5, and respective hydraulic cylinders for actuating them, namely, a boom cylinder 6, an arm cylinder 7 and a bucket cylinder 8.

The upper slewing body 2 includes an upper frame 10 as a base, and a plurality of devices and installations provided thereon. The devices and installations include an engine compartment 12, a cabin 17, a hydraulic oil tank 18, a fuel tank 19, a central foothold 20, and a maintenance access passage P1.

The engine compartment 12 is provided on a rear end region of the upper frame 10, formed with an upper opening, which can be selectively opened and closed by a bonnet 11. The engine compartment 12 houses an engine 13 as a power source and engine-related devices, namely, a radiator 14, a cooling fan 15, a hydraulic pump 16 and others.

The cabin 17 is disposed at a front side of the engine compartment 12 and on one of right and left regions of the upper frame 10. FIG. 8 shows an arrangement of the cabin disposed on the left region, according which the following description will be made. As used in this specification, the terms "front-rear (forward, rearward)" and "right-left (rightward, leftward)" indicate directions as viewed from an operator seated within the cabin 17, wherein the "right-left direction" means a width direction of the upper frame 10.

The hydraulic oil tank 18 and the fuel tank 19 are configured to store therein hydraulic oil and fuel, respectively, provided at a front side of the engine compartment 12 and on a side opposite to the cabin 17 in a right-left direction, i.e., on a right region of the upper frame 10, so as to be aligned in a front-rear direction. There can be another case where the tanks 18, 19 is aligned in the right-left direction.

The central foothold 20, which is a foothold for maintenance on the devices and the like including the engine 13, housed in the engine compartment 12, is provided immediately at a front side of the engine compartment 12 and on an intermediate region of the upper frame 10 widthwise of the upper frame 10. The maintenance access passage P1, which is a passage for guiding a worker such as a maintenance worker to the central foothold 20, is provided at a front side of the hydraulic tank 18. FIG. 8 further shows an air cleaner 21, which is disposed on the left region of the upper frame 10 and between the engine compartment 12 and the cabin 17.

The maintenance access passage P1 includes a footplate 22 and two stair-steps 23, 24. The footplate 22 is provided in a front end region of the upper frame 10 to form a front end portion of the maintenance access passage P1. Each of the stair-steps 23, 24 is formed typically by utilization of an upper surface of equipment mounted on the upper frame 10. For example, it is possible to form the first stair-step 23 by a top cover of a tool box 25 and to form the second stair-step 24 by a top wall or top cover of the fuel tank 19.

In order to discriminate the central foothold 20 and the maintenance access passage P1 from other equipment, FIG. 8 indicates a heavy line surrounding the central foothold 20, the footplate 22 and the stair-steps 23, 24, and diagonal lines additionally given thereto.

Next will be described some embodiments of the present invention. These embodiments include improvement of structure for transit between the central foothold 20 and the maintenance access passage P1 in the hydraulic excavator of the comparative example.

Figure 3:
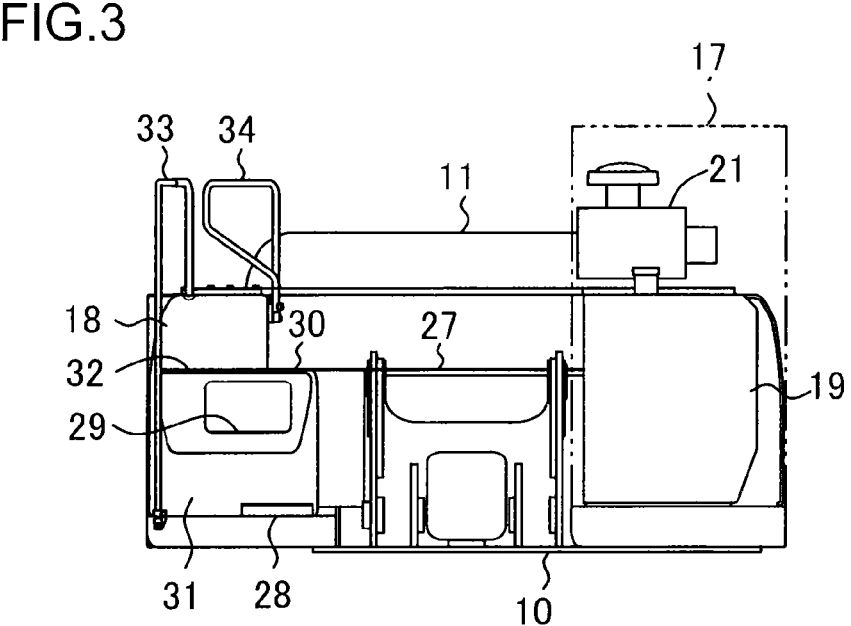
FIG. 3 is a front view of the upper slewing body.
Figure 4:
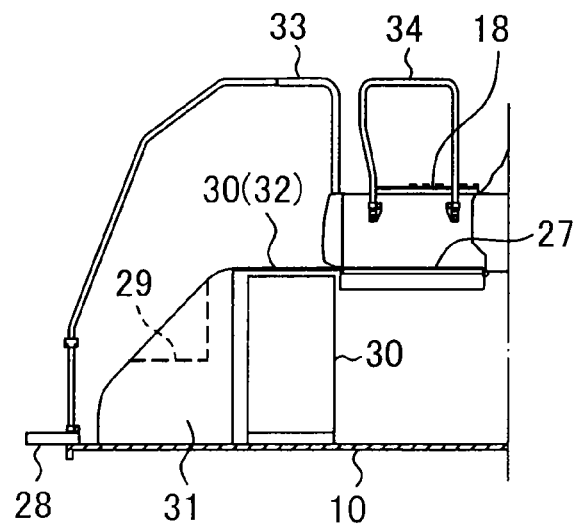
FIG. 4 is a sectional view taken along the line IV-IV in FIG. 2.
Figure 5:
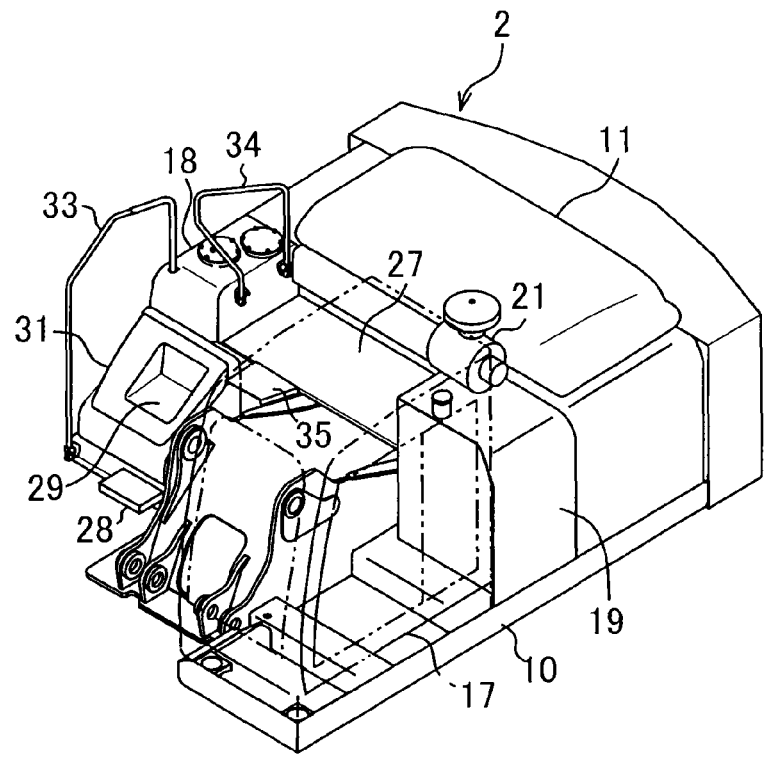
FIG. 5 is a perspective view of an upper slewing body of a hydraulic excavator according to a second embodiment of the present invention.
Figure 6:
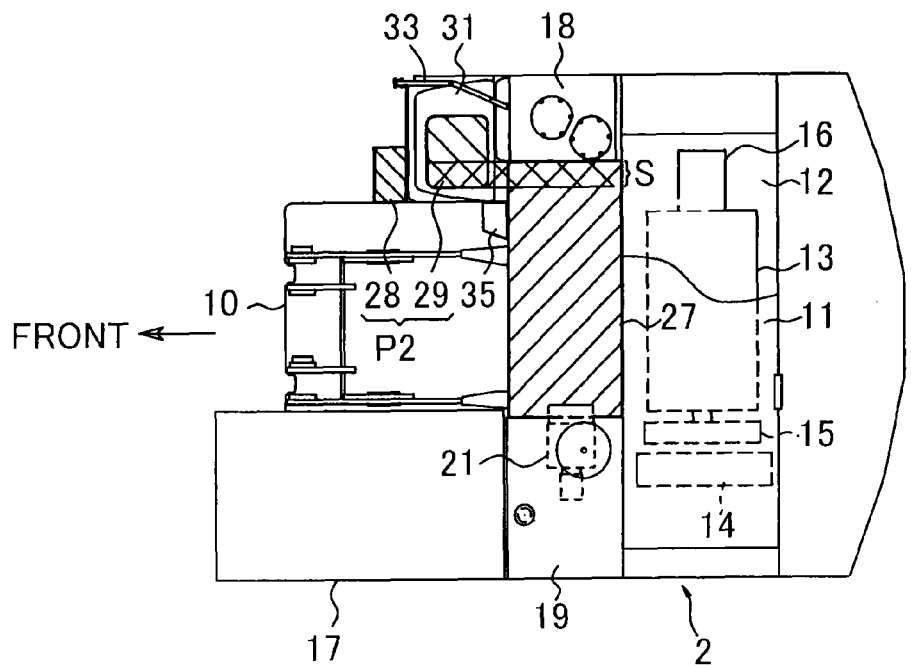
FIG. 6 is a top plan view of the upper slewing body shown in FIG. 5.

FIGS. 1 to 4 show a first embodiment and FIGS. 5 and 6 show a second embodiment. Each of hydraulic excavators according to the first and second embodiments includes the following configuration in common with the hydraulic excavator of the comparative example shown in FIGS. 7 and 8.

(A) The hydraulic excavator includes a lower traveling body, and an upper slewing body 2 mounted on the lower traveling body slewably about an axis which is vertical to a ground surface.

(B) The upper slewing body 2 includes an upper frame 10 as a base, and a plurality of devices and installations provided thereon. The devices and installations include an engine compartment 12, a cabin 17, a hydraulic oil tank 18 configured to store hydraulic oil therein, a fuel tank 19 configured to store fuel therein, a central foothold 27, and a maintenance access passage P2.

(C) The engine compartment 12 is provided on a rear region of the upper frame 10, and formed with an upper opening which can be selectively opened and closed by a bonnet 11. The engine compartment 12 houses an engine 13 as a power source and a plurality of engine-related devices, namely, a radiator 14, a cooling fan 15, a hydraulic pump 16 and others.

Figure 1:
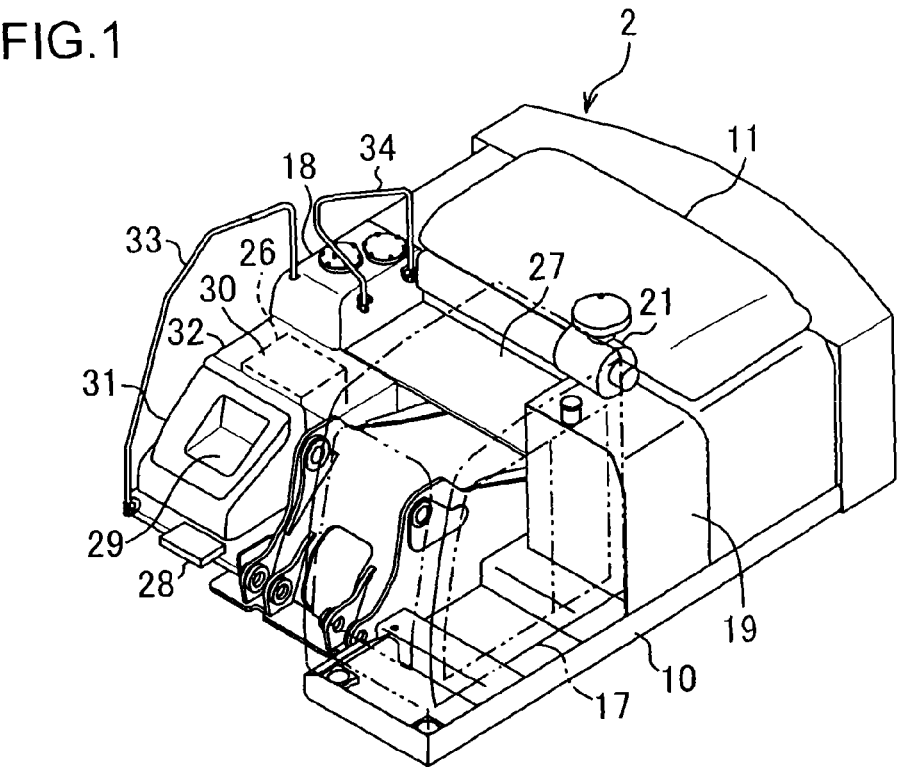
FIG. 1 is a perspective view of an upper slewing body of a hydraulic excavator according to a first embodiment of the present invention.

(D) The cabin 17 is disposed at a front side of the engine compartment 12 and on a left region of the upper frame 10. In FIGS. 1 and 3, the cabin 17 is indicated by the two-dot chain lines for convenience sake.

(E) The hydraulic oil tank 18 is disposed at a front side of the engine compartment 12 and on a side opposite to the cabin 17 widthwise of the upper frame 10.

Differently from the comparative example, the fuel tank 19 in the first and second embodiments is disposed on the upper frame 10 at a position rearward of the cabin 17, i.e., at a position between the cabin 17 and the engine compartment 12, and on the fuel tank 19 is disposed an air cleaner 21 for filtering engine intake air. Thus, while the hydraulic oil and fuel tanks 18, 19 in the comparative example shown in FIGS. 7 and 8 are provided on the right region of the upper frame 10, the hydraulic oil and fuel tanks 18, 19 in the first and second embodiments are distributed on the right and left regions on the upper frame 10, and the air cleaner 21 is three-dimensionally superposed on the fuel tank 19.

Figure 2:
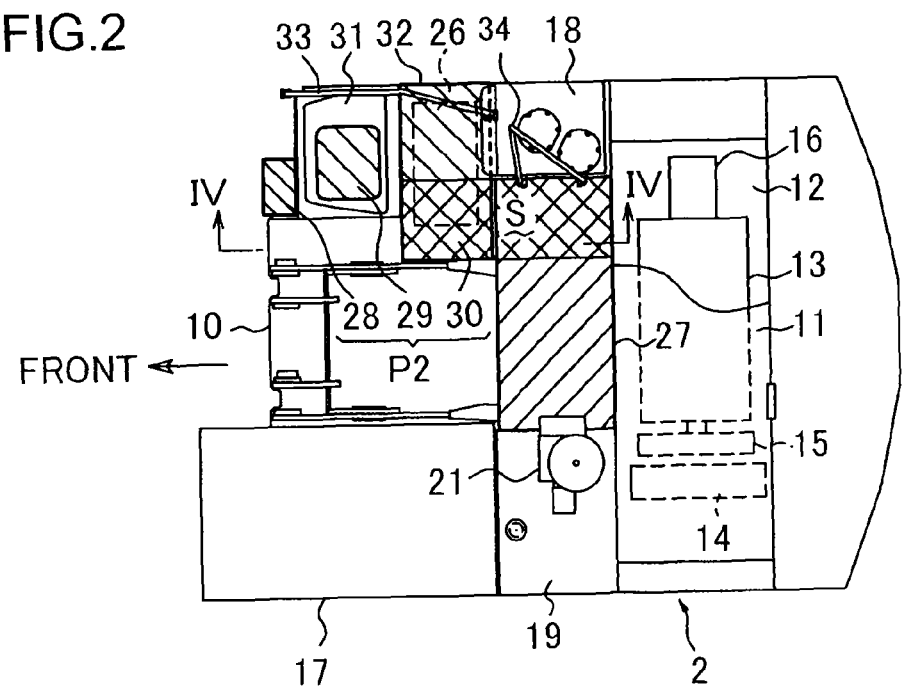
FIG. 2 is a top plan view of the upper slewing body.

This arrangement makes it possible to create a vacant space equivalent to the fuel tank 19, at a position forward of the hydraulic oil tank 18, i.e., beneath the maintenance access passage P1 described in detail later, thereby allowing additional equipment, e.g., one or both of a liquid reductant tank 26 and a battery for a hybrid model, to be disposed in the vacant space. The arrangement also provides an allowance of space on the right region of the upper frame 10 with respect to a front-rear direction, thereby allowing the hydraulic oil tank 18 to have a rectangular planar shape with a dimension in a right-left direction less than a dimension in the front-rear direction as shown in FIG. 2, or to be oriented so as to have the dimensions. This enables the tanks 18, 19 to be largely spaced.

On the premise of the above arrangement, the central foothold 27 is disposed, as a foothold for on devices and the like including the engine 13 which are housed in the engine compartment 12, immediately at a front side of the engine compartment 12 and on a central region of the upper frame 10 widthwise of the upper frame 10. In the first and second embodiments, the central foothold 27 is located between the hydraulic oil and fuel tanks 18, 19. The hydraulic oil and fuel tanks 18, 19 also have respective height dimensions allowing them to protrude upward beyond the central foothold 27 as shown in FIGS. 1, 3 and 4.

The maintenance access passage P2 is disposed, as a passage linked to the central foothold 27 to guide a worker such as a maintenance worker to the central foothold 27, on a region which is one of the right and left regions of the upper frame 10 and which is a region on opposite side to the cabin 17. Specifically, each of the maintenance access passages P2 in the first and second embodiments is provided on the right region of the upper frame 10 to be located at a front side of the hydraulic oil tank 18.

The maintenance access passage P1 in the first embodiment has a stepped portion including a footplate 28 and two stair-steps 29, 30, the stepped portion extending rearward while elevated. The footplate 28 is provided in the front end region of the upper frame 10 to form a front end portion of the maintenance access passage P1. The number of stair-steps according to the present invention may be one or may be three or more.

As with the stair-steps 23, 24 in the comparative example, the stair-steps 29, are formed by utilization of equipment installed on the upper frame 10. The first stair-step 29 can be formed, for example, by utilization of an upper lid of a tool box 25 mounted on a front end of the right region of the upper frame 10, specifically by inclining the upper lid forward and concaving an intermediate portion thereof. The second stair-step 30 can be formed, for example, by utilization of a cover 32 covering an upper side of the liquid reductant tank 26 disposed at a rear side of the tool box 31. This allows the second stair-step 30 to be opened rightward and leftward with no obstacle adjacent thereto.

In order to discriminate the central foothold 27 and the maintenance access passage P2 from other equipment, each of the central foothold 27, FIG. 2 indicates a heavy line surrounding the footplate 28 and the stair-steps 29, 30 and diagonal lines additionally given thereto.

The maintenance access passage P2 in the first embodiment, furthermore, satisfies the following conditions:
(I) the maintenance access passage P2 has an upper end portion with a passage edge which is the most inward edge widthwise of the upper frame 10, i.e., a left edge of the second stair-step 30, the passage edge being located inward, widthwise of the upper frame 10, of a foothold edge which is one of opposite right and left edges of the central foothold 27 and an edge closer to the maintenance access passage P2, i.e., a right edge of the central foothold 27; and
(II) the upper end portion of the maintenance access passage P2 is adjacent to the central foothold 27 at a front side thereof so as to be approximately flush with the central foothold 27. In the condition (II), the term "approximately flush with the central foothold 27" includes not only an arrangement where the upper end portion of the maintenance access passage P2 is completely flush with the central foothold 27 but also an arrangement of involving a step between the upper end portion of the maintenance access passage P2 and the central foothold 27, the step being so small as to exert no influence on transit of a worker. Besides, the term "adjacent to the central foothold 27" includes a first arrangement involving complete contact of the upper end portion of the maintenance access passage P2 with the central foothold 27 with no gap and a second arrangement involving a gap therebetween which gap is so small as to exert no influence on transit of a worker.

The condition (1) as to the relative positions of the passage edge and the foothold edge is enabled to be satisfied, by the distribution of the hydraulic oil and fuel tanks 18, 19 on the right and left regions which distribution allows the space between the tanks 18, 19 to be increased.

The satisfaction of the conditions (I) and (II) makes it possible to form a transit zone S where the upper end portion of the maintenance access passage P2 and a part of the central foothold 27 are continuously aligned on a straight line in the front-rear direction, the transit zone S being cross-hatched in FIG. 2 with the reference sign "S" which is given only in FIG. 2. The maintenance access passage P2 is preferably attached with a hand rail, e.g., a lower hand rail 33 and an upper hand rail 34 shown in FIG. 2. The hand rails 33 and 34 are disposed in a right end portion of the maintenance access passage P2 along a right edge thereof.

The above arrangement enables the following advantageous effects to be obtained.
(1) The arrangement facilitates the transit of a worker between the maintenance access passage P2 and the central foothold 27. The upper end portion of the maintenance access passage P2 and a part of the central foothold 27 are aligned on a straight line in the front-rear direction to form the transit zone S, thereby freeing a worker of requirement of an irregular movement such as an oblique or transverse movement during the transit, differently from the comparative example not including such a continuous transit zone S. The worker is, thus, allowed to transfer smoothly and safely between the maintenance access passage P2 and the central foothold 27 by a natural walk for simply walking straight up and down the passage. Particularly, the maintenance access passage P2 in the first embodiment, whose upper end portion is adjacent to the central foothold 27 at a front side of the central foothold 27 and approximately flush with the central foothold 27 to thereby form a transit zone S approximately continuous in the front-rear direction, can enhance safety and smoothness in the transit. This effect is particularly marked in the case of a stepped maintenance access passage which is likely to unbalance a worker, such as the maintenance access passage P2 in this embodiment.
(2) The transit zone S, which can be formed by setting respective positions of the foothold edge and the passage edge in the right-left direction, does not require any change in a front-rear directional dimension of a space for other equipment. The transit zone S, thus, exerts no influence on the arrangement of other equipment.
(3) The upper end portion of the maintenance access passage P2, namely, the second stair-step 30, is opened both rightward and leftward, thus allowing a worker to make transit smoother. In comparison with an example of a passage formed by concaving a part of a top wall of a tank, the example involves a pair of sidewalls formed by a tank on both sides of the passage, which sidewalls can be obstacle against the transit, while the above embodiment does not involve such an obstacle on either side of the stair-step 30.
(4) Respective upward protrusions of the hydraulic oil and fuel tanks 18, 19 beyond the central foothold 27 enables the central foothold 27 to be located lower than respective protruding portions of the tanks 18, 19 while securing respective capacities of the tank 18, 19, thereby allowing a safety fence to be eliminated or lowered. This effect can be obtained by at least one upward protrusion of a specific tank beyond the central foothold 27, the specific tank being one of the tanks 18, 19 and being closer to the maintenance access passage P2 (in the first and second embodiments, the hydraulic oil tank 18).

The second embodiment shown in FIGS. 5 and 6 is different from the first embodiment only in the following point. The second embodiment is devoid of additional equipment such as the liquid reductant tank 26 in the first embodiment, and, hence, the maintenance access passage P2 in the second embodiment does not include the second stair-step 30 in the first embodiment. In other words, the maintenance access passage P2 in the second embodiment is constituted by only a footplate 28 in common with the first embodiment and a single stair-step 29, which is a stair-step equivalent to the first stair-step in the first embodiment.

Also the second embodiment allows a transit zone S to be formed between the stair-step 29 and the central foothold 27 and to have continuity. Specifically, the transit zone S cross-hatched in FIG. 6 is formed by location of the foothold edge of the central foothold 27 at a right side of a passage edge of the maintenance access passage P2 (left edge of the stair-step 29) and alignment of an upper end portion of the maintenance access passage P2 and a part of the central foothold 27 on a straight line in the front-rear direction.

However, differently from the first embodiment, the stair-step 29 in the second embodiment does not make direct continuity with the central foothold 27 by itself but secure the continuity by interposition of an upper end portion of the tool box 31 between the stair-step 29 and the central foothold 27.

Besides, the second embodiment further includes an auxiliary step 35. The auxiliary step 35, which is added in consideration with a smaller width of the transit zone S in the second embodiment than that of the transit zone S in the first embodiment, is provided at a position adjacent to the central foothold 27 and the upper end portion of the maintenance access passage P2, i.e., a left portion of a rear end of the tool box 31, at a front and right side of the central foothold 27, to protrude beyond the central foothold 27 and the upper end portion of the maintenance access passage P2, in an eave-like shape, thereby substantially widening the transit zone S to enhance safety in the transit.

The present invention is not limited to the first and second embodiments, including, for example, the following embodiments.

(1) The maintenance access passage in the present invention is not limited to the maintenance access passages P2 in the first and second embodiments but permitted to be other one, for example, having a sloped region or having a combination of a sloped region and a stepped portion.

(2) The hydraulic oil tank 18 and the fuel tank 19 in the first and second embodiments may be arranged reversely in the right-left direction. Specifically, it is also possible to dispose the hydraulic oil tank 18 at a side of the cabin 17 and dispose the fuel tank 19 at a side of the maintenance access passage P2.

(3) The upper surface of the stair-step 29, though including a concave surface in the first and second embodiments, can be also a flat surface. Also in this case, it is preferable to open the upper wall both rightward and leftward, with no obstacle adjacent thereto.

(4) The auxiliary step 35 in the second embodiment can be added also to the first embodiment for further enhancement of transit performance.

(5) Not limited to a hydraulic excavator, the present invention can be widely applied to any other type of construction machine provided with a central foothold, and a maintenance access passage for guiding a worker such as a maintenance worker to the central foothold.

As above, there can be provided a construction machine having a central foothold and a maintenance access passage and allowing a worker to transfer between the central foothold and the maintenance access passage smooth and safely, with low influence on arrangement of other equipment. The provided construction machine comprises a lower traveling body and an upper slewing body slewably mounted on the lower traveling body. The upper slewing body includes: an upper frame as a base; an engine compartment provided on a rear end region of the upper frame to house an engine and an engine-related device; a cabin provided on a front region of the upper frame in one of right and left regions of the upper frame; a central foothold for maintenance work, the central foothold provided immediately at a front side of the engine compartment and on a central region of the upper frame widthwise of the upper frame; and a maintenance access passage provided on a region which is one of the right and left regions of the upper frame and is a region on an opposite side to the cabin, the maintenance access passage extending rearward while elevated to guide a worker from the ground at a front side of the upper frame to the central foothold. The maintenance access passage has an upper end portion including a most inward edge widthwise of the upper frame, the most inward edge being located inward, widthwise of the upper frame, of an edge which edge is one of opposite edges of the central foothold widthwise of the upper frame and which edge is closer to the maintenance access passage than the other edge, thereby aligning a part of the maintenance access passage and a part of the central foothold in a straight line extending in a front-rear direction to form a transit region between the maintenance access passage and the central foothold.

The provided construction machine, in which the upper end portion of the maintenance access passage and a part of the central foothold are aligned with each other on a straight line in the front-rear direction to form a transit zone, frees a worker of requirement of an irregular movement such as an oblique or transverse movement between the maintenance access passage and the central foothold, differently from a structure devoid of such continuity in the front-rear direction. Thus, the construction machine allows a worker to transfer smooth and safely between the maintenance access passage and the central foothold by a natural walk for simply walking straight up and down the passage. Furthermore, the transit zone can be formed by setting relative positions of a foothold edge and a passage edge in a right-left direction to each other, not requiring any change in a front-rear directional dimension of a space for other equipment. This lowers an influence exerted on the arrangement of other equipment.

The maintenance access passage is, preferably, adjacent to the central foothold so as to be approximately flush with the central foothold, at a position forward of the central foothold, to thereby make the transit zone continuous in the front-rear direction. The continuity of the transit zone enables the safety and smoothness of the transit to be further enhanced.

Preferably, the upper end portion of the maintenance access passage is opened both rightward and leftward. This openness enhances the smoothness of the transit. For example, in the case of forming an upper end portion of the maintenance access passage by concaving a part of a top wall of a tank, as in the Patent Literature 3, the concave portion involves sidewalls in the tank on lateral sides of the passage, the sidewalls being likely to disturb smooth transit; in contract, the structure according to the present invention allows the maintenance access passage to be opened rightward and leftward, thereby allowing a worker to transfer smoother.

The construction machine according to the present invention, preferably, further includes a fuel tank and a hydraulic oil tank provided on the upper frame at respective positions forward of the engine compartment, wherein the fuel tank is located at one of right and left sides while the hydraulic oil tank is located at the other of the right and left sides so as to be opposed to the fuel tank in a right-left direction, and wherein the central foothold is disposed between the fuel tank and the hydraulic oil tank. This distribution of the hydraulic oil tank and the fuel tanks, which tanks are usually large-sized, on the right and left regions allows the central foothold centrally located between the two tanks to have an increased width dimension, thereby allowing the foothold edge to be easily located at an outer side of the passage edge.

In this case, more preferable is that a specific tank, which is one of the fuel tank and the hydraulic oil tank and which is a tank located on a right or left side on which side the maintenance access passage is disposed, protrudes upward beyond the central foothold. The protrusion of the specific tank allows the central foothold to have a lowered height position relative to the tank, thereby allowing a safety fence to be eliminated or to have a reduced height dimension.

Preferably, the maintenance access passage has a stepped portion extending rearward while elevated to reach the upper end portion, wherein the stepped portion includes at least one stair-step, and wherein the transit zone is formed by the upper end portion of the maintenance access passage and the central foothold. Since the maintenance access passage having such a stepped portion is likely to unbalance a worker due to change in his walking stride and a lift amount of a leg particularly when the worker transfers to the central foothold while walking up the passage, the above structure not forcing a worker to make a transverse movement for the transit, i.e., the structure allowing the transit to be made only by a straight movement in the front-rear direction, brings out a more significant effect of securing safety.

Preferably, the construction machine of the present invention further comprises an auxiliary step adjacent, at a front side of the central foothold, to each of the central foothold and the upper end portion of the maintenance access passage. The auxiliary step can substantially widen the transit zone to thereby further enhance the safety.

This application is based on Japanese Patent application No. 2013-264092 filed in Japan Patent Office on Dec. 20, 2013, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A construction machine comprising:
a lower traveling body; and
an upper slewing body slewably mounted on the lower traveling body, the upper slewing body including: an upper frame as a base; an engine compartment provided on a rear end region of the upper frame to house an engine and an engine-related device, the engine compartment being formed with an upper opening; a bonnet which selectively opens and closes the upper opening; a cabin provided on a front region of the upper frame in one of right and left regions of the upper frame; a central foothold for maintenance work, the central foothold provided immediately at a front side of the engine compartment and the bonnet on a central region of the upper frame widthwise of the upper frame, the central foothold being lower than the bonnet; and a maintenance access passage provided on a region which is one of the right and left regions of the upper frame and is a region on an opposite side to the cabin, the maintenance access passage extending rearward while elevated to guide a worker from the ground at a front side of the upper frame to the central foothold, wherein
the maintenance access passage has a stepped portion extending rearward and including a plurality of stair-step, the plurality of stair step including a most upper stair step which forms an upper end portion of the maintenance access passage, the plurality of the stair steps including respective most inward edges widthwise of the upper frame, the most inward edge of the most upper stair step being located inward, widthwise of the upper frame, of the most inward edge of the stair step other than the most upper stair step, and
wherein the most inward edge of the most upper stair step is located inward, widthwise of the upper frame, of an edge which edge is one of opposite edges of the central foothold widthwise of the upper frame and which edge is closer to the maintenance access passage than the other edge, thereby aligning a part of the maintenance access passage and a part of the central foothold in a straight line extending in a front-rear direction to form a transit region between the most upper stair step of the maintenance access passage and the central foothold.

2. The construction machine as defined in claim 1, wherein the maintenance access passage is adjacent to the central foothold so as to make the upper end portion of the maintenance access passage approximately flush with the central foothold, at a position forward of the central foothold, to thereby make the transit zone continuous in the front-rear direction.

3. The construction machine as defined in claim 1, wherein the upper end portion of the maintenance access passage is opened both rightward and leftward.

4. The construction machine as defined in claim 1, further comprising a fuel tank and a hydraulic oil tank provided on the upper frame at respective positions forward of the engine compartment, wherein the fuel tank is located at one of right and left sides while the hydraulic oil tank is located at the other of the right and left sides so as to be opposed to the fuel tank in a right-left direction, and wherein the central foothold is disposed between the fuel tank and the hydraulic oil tank.

5. The construction machine as defined in claim 4, wherein a specific tank which is one of the fuel tank and the hydraulic oil tank and which is a tank located on a right or left side on which side the maintenance access passage is disposed protrudes upward beyond the central foothold.

6. The construction machine as defined in claim 1, further comprising an auxiliary step adjacent, at a front side of the central foothold, to each of the central foothold and the upper end portion of the maintenance access passage.

* * * * *